United States Patent
Kodimer

(10) Patent No.: US 10,868,920 B1
(45) Date of Patent: Dec. 15, 2020

(54) SYSTEM AND METHOD FOR PROGRESSIVE MULTILEVEL SELF-SERVICE DEVICE DIAGNOSTICS AND RESOLUTION

(71) Applicant: Toshiba TEC Kabushiki Kaisha, Shinagawa-ku (JP)

(72) Inventor: Marianne Kodimer, Huntington Beach, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/521,933

(22) Filed: Jul. 25, 2019

(51) Int. Cl.
*H04N 1/00* (2006.01)
*H04L 5/26* (2006.01)
*H04L 12/58* (2006.01)

(52) U.S. Cl.
CPC ....... *H04N 1/00029* (2013.01); *H04L 51/046* (2013.01); *H04L 51/26* (2013.01); *H04N 1/0001* (2013.01); *H04N 1/00408* (2013.01); *H04N 2201/0094* (2013.01)

(58) Field of Classification Search
CPC combination set(s) only.
See application file for complete search history.

(56) References Cited

U.S. PATENT DOCUMENTS

| | | | |
|---|---|---|---|
| 6,408,407 B1* | 6/2002 | Sadler | G06F 11/0736 714/2 |
| 2015/0142643 A1* | 5/2015 | Ceribelli | G06Q 30/04 705/39 |
| 2016/0073159 A1* | 3/2016 | Chidambaram | H04N 21/234 725/132 |
| 2018/0115454 A1* | 4/2018 | Kodimer | H04L 29/06176 |
| 2019/0306327 A1* | 10/2019 | Matysiak | H04L 51/02 |

* cited by examiner

*Primary Examiner* — Helen Zong
(74) *Attorney, Agent, or Firm* — Ulmer & Berne LLP

(57) ABSTRACT

A system and method for multilevel self-service device diagnostics and resolution includes a processor, a user interface and a memory storing various communication sequences. Communication sequences include one or more communication modes and steps to be performed to address a multifunction peripheral device issue. Sequences are stored associatively with a data corresponding to an error condition. A data interface transmits state data corresponding to a current device error condition. An initial communication sequence associated with the error condition corresponding to transmitted state data is selected and initiated on the user interface. The device communicates updated state data corresponding to the error condition after completion of the initial sequence. A determination is made as to whether the error condition has been alleviated. If not, an elevated communication sequence is selected and initiated. A communication sequence may also be selected based on sophistication or experience of an associated user.

13 Claims, 7 Drawing Sheets

US 10,868,920 B1

SYSTEM AND METHOD FOR PROGRESSIVE MULTILEVEL SELF-SERVICE DEVICE DIAGNOSTICS AND RESOLUTION

TECHNICAL FIELD

This application relates generally to maintenance of devices such as multifunction peripherals. The application relates more particularly to automatically selecting communication and collaboration sequences and modes in accordance with diagnosed device error conditions.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs are complex devices with many interacting parts that are subject to wear and tear. Error conditions may result when an MFP is low or out of consumables, such as paper, ink or toner. Error conditions may also be resultant from a hardware or software issue. A common error condition is a paper jam which must be cleared before printing or copying can resume.

BRIEF DESCRIPTION OF THE DRAWINGS

Various embodiments will become better understood with regard to the following description, appended claims and accompanying drawings wherein:

DETAILED DESCRIPTION

Figure 1:
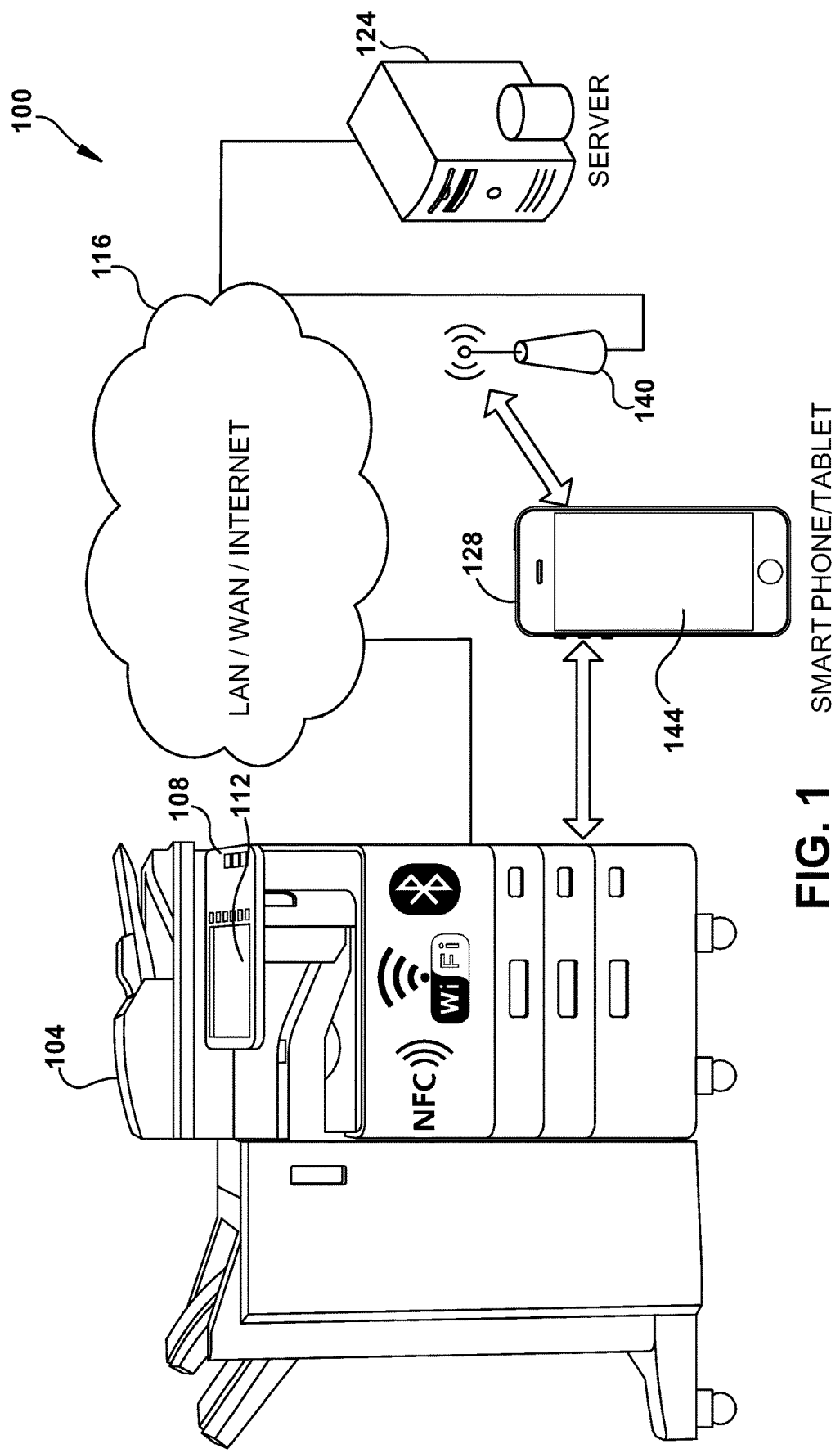
FIG. 1 is an example embodiment of a system for assisted device diagnostics and repair.

The systems and methods disclosed herein are described in detail by way of examples and with reference to the figures. It will be appreciated that modifications to disclosed and described examples, arrangements, configurations, components, elements, apparatuses, devices, methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Error conditions in MFPs must be addressed before some or all of their functionality can be returned. Certain error conditions may be relatively straightforward to resolve. Certain error conditions may be straightforward to resolve for a more sophisticated user, but present a challenge for someone less familiar with the device. It is highly desirable to address any device failure condition as quickly and inexpensively as possible. Ideally, any device user would be able to quickly address a diagnosed error condition so that it can be fixed on the spot. As will be detailed below, the subject application teaches embodiments wherein user instructions, along with a communication mode corresponding to those user instructions, are selected and displayed in accordance with a diagnosed device condition and a skill level associated with a user receiving the instructions.

Unified communications (UC) comprise a communication sequence or mode with integration of enterprise communication services such as instant messaging (chat), presence information, voice (including IP telephony), mobility features (including extension mobility and single number reach), audio, web & video conferencing, fixed-mobile convergence (FMC), desktop sharing, data sharing (including web connected electronic interactive whiteboards), call control and speech recognition with non-real-time communication services such as unified messaging (integrated voicemail, e-mail, SMS and fax). UC is not necessarily a single product, but a set of products that provides a consistent unified user interface and user experience across multiple devices and media types. UC communications may be interaction between humans or humans and machines.

In a broad sense, UC can encompass all forms of communications, including collaborations, that are exchanged via a network to include other forms of communications such as Internet Protocol Television (IPTV) and digital signage communications as they become an integrated part of the network communications deployment and may be directed as one-to-one communications or broadcast communications from one to many.

UC allows an individual to send a message on one medium and receive the same communication on another medium. For example, an individual can receive a voicemail message and choose to access it through e-mail or a cell phone. If the sender is online according to the presence information and currently accepts calls, the response can be sent immediately through text chat or a video call. Otherwise, it may be sent as a non-real-time message that can be accessed through a variety of media.

Example embodiments herein employ UC solutions and seek to combine different modes of communications or collaboration to increase productivity and efficiency while reducing costs. They provide greater employee flexibility and mobility while driving deeper levels of employee engagement through UC tools.

Collaboration between service technician and end user towards fixing a device can be cost effective or costly depending on the severity of the problem and solution. In example embodiments herein, a tiered approach provides initial, automated troubleshooting which becomes more collaborative depending on the problem, resolution, and ability of the user to solve the problem. Example embodiments employ a tiered approach to MFP self-servicing, beginning with basic text or speech diagnostic at the lowest level and, as the problem resolution difficulty increases, the level of UC increases. As a result, cost savings and customer satisfaction is optimized.

In accordance with the subject application, FIG. 1 illustrates an example embodiment of a system 100 for assisted device diagnostics and repair that includes one or more MFPs, illustrated by way of example by MFP 104. MFP 104 includes a user interface 108 suitably comprised of touchscreen 112. MFP 104 is in network communication with network cloud 116, suitably comprised of any wireless or wired local area network (LAN) or a wide area network (WAN) which can comprise the Internet, or any suitable combination thereof. Also in network communication are one or more digital devices including, for example server 124 or smartphone or tablet computer 128. The subject example embodiment reflects interaction with a cell phone, however it will be appreciated that any suitable user device, including a workstation or other computer, such as server 124, may be used.

Smartphone 128 is in wireless data communication with MFP 104 via any suitable means, such a near field communication (NFC), Wi-Fi direct, Wi-Fi via hotspot 140 or Bluetooth. When a state of MFP 104 changes to include an error condition, that condition is relayed wirelessly to smartphone 128 which has been preprogrammed to store sequence data corresponding to a plurality of communication and collaboration sequences, each sequence being stored associatively with a data corresponding to a multifunction peripheral error condition. A cell phone processor selects an initial communication and collaboration sequence associated with an error condition corresponding to a received error condition. A mobile app on smartphone 128 communicates with MFP 104 to determine its status and error state, suitably from state or status data supplied by the MFP. Such data is suitably from a device sensor. Example sensors include sensors that monitor temperature, paper levels, ink or toner levels, paper jams, and the like. The app provides resolution in levels of escalation as required and determined in real time.

A selected initial communication and collaboration sequence is displayed to a user on a device user interface, such as touchscreen 144 on smartphone 128. An initial communication and collaboration sequence may also be selected by determining a device experience or sophistication level of a user associated with smartphone 128. Such a determination is suitably done by maintaining a lookup table of various skill levels of various MFP users wherein each user's skill level is stored associatively with their identity. As will be detailed further below, further tests of device conditions can be performed after completion of an initial communication and collaboration sequence.

Figure 2:
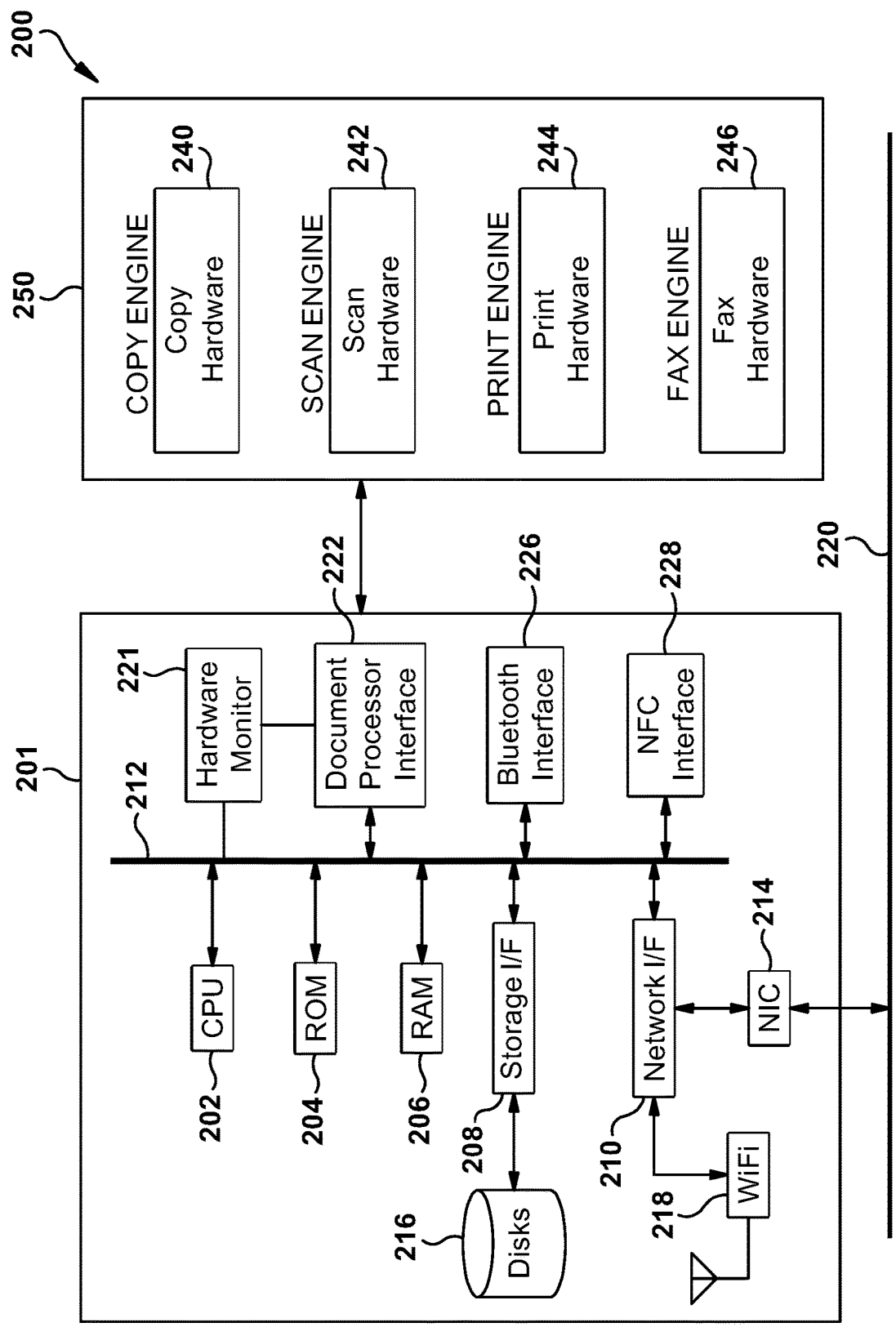
FIG. 2 is an example embodiment of a multifunction peripheral.

Turning now to FIG. 2 illustrated is an example embodiment of a networked digital device comprised of document rendering system 200 suitably comprised within an MFP, such as with MFP 104 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as WiFi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 is also in data communication with a hardware monitor 221, suitably amassing state data from subassemblies, sensors, digital thermometers, or the like, and suitably including digital state date including device codes, such as device error codes. Processor 202 can also be in data communication a document processor interface 222, with BLUETOOTH interface 226 and NFC interface 228 via data path 212.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrate example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional hardware 250. It will be understood that functional units are suitably comprised of intelligent units, including any suitable hardware or software platform.

Figure 3:
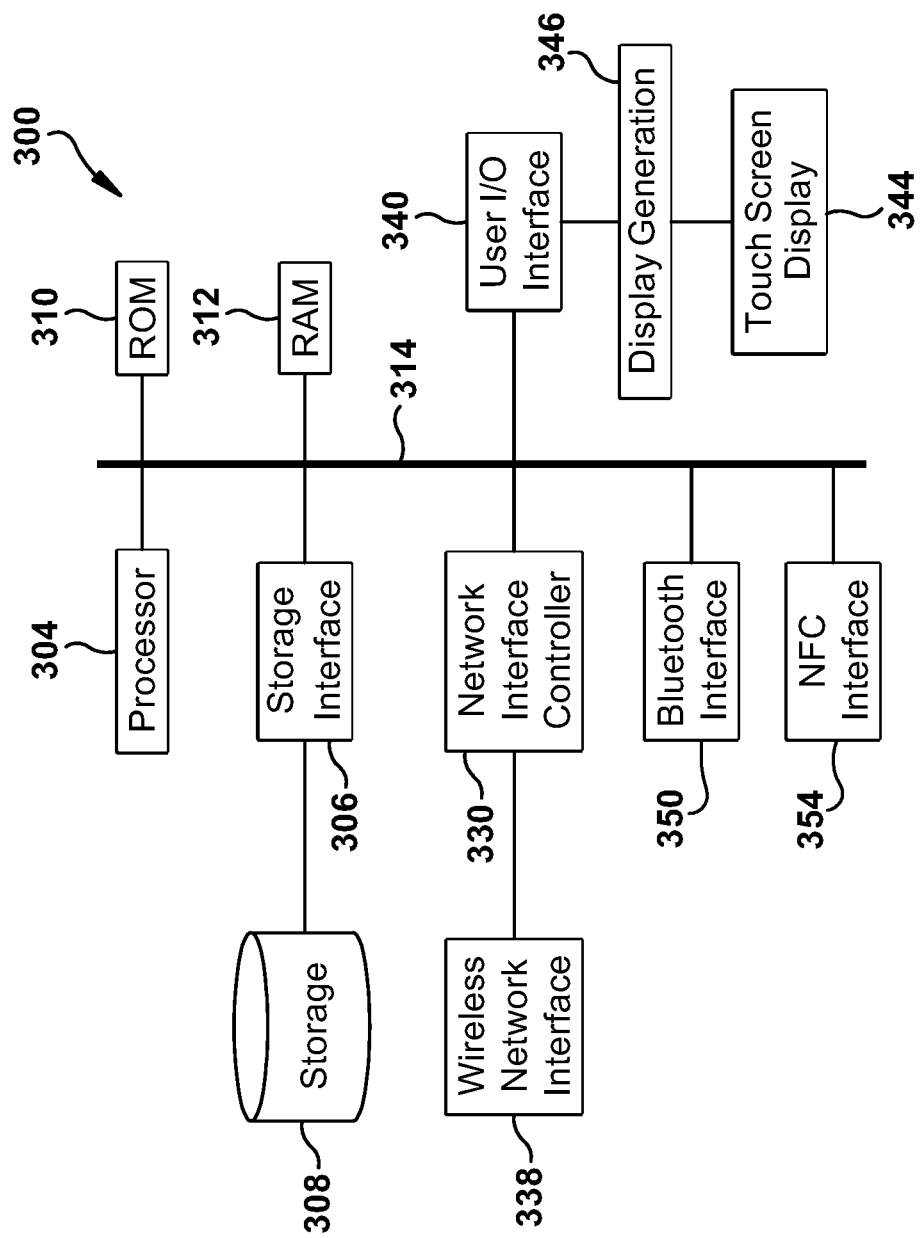
FIG. 3 is an example embodiment of a digital device such as a portable digital device.

Turning now to FIG. 3, illustrated is an example of a digital device system such as smartphone 128 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to an MFP or server is via a data network, such as a local area network (LAN), a wide arear network (WAN), which may comprise the Internet, or any suitable combination thereof. A digital data connection is also suitably directly with an MFP or server, such as via BLUETOOTH, optical data transfer, Wi-Fi direct, or the like.

Processor 304 is also in data communication with a user input/output (I/O) interface 340 which provides data communication with user peripherals, such as touch screen display 344 via display generator 346, as well as keyboards, mice, track balls, touch screens, or the like. Processor 304 is also in data communication with Bluetooth interface 350 and NFC interface 354. It will be understood that functional units are suitably comprised of intelligent units, including any suitable hardware or software platform.

Figure 4:
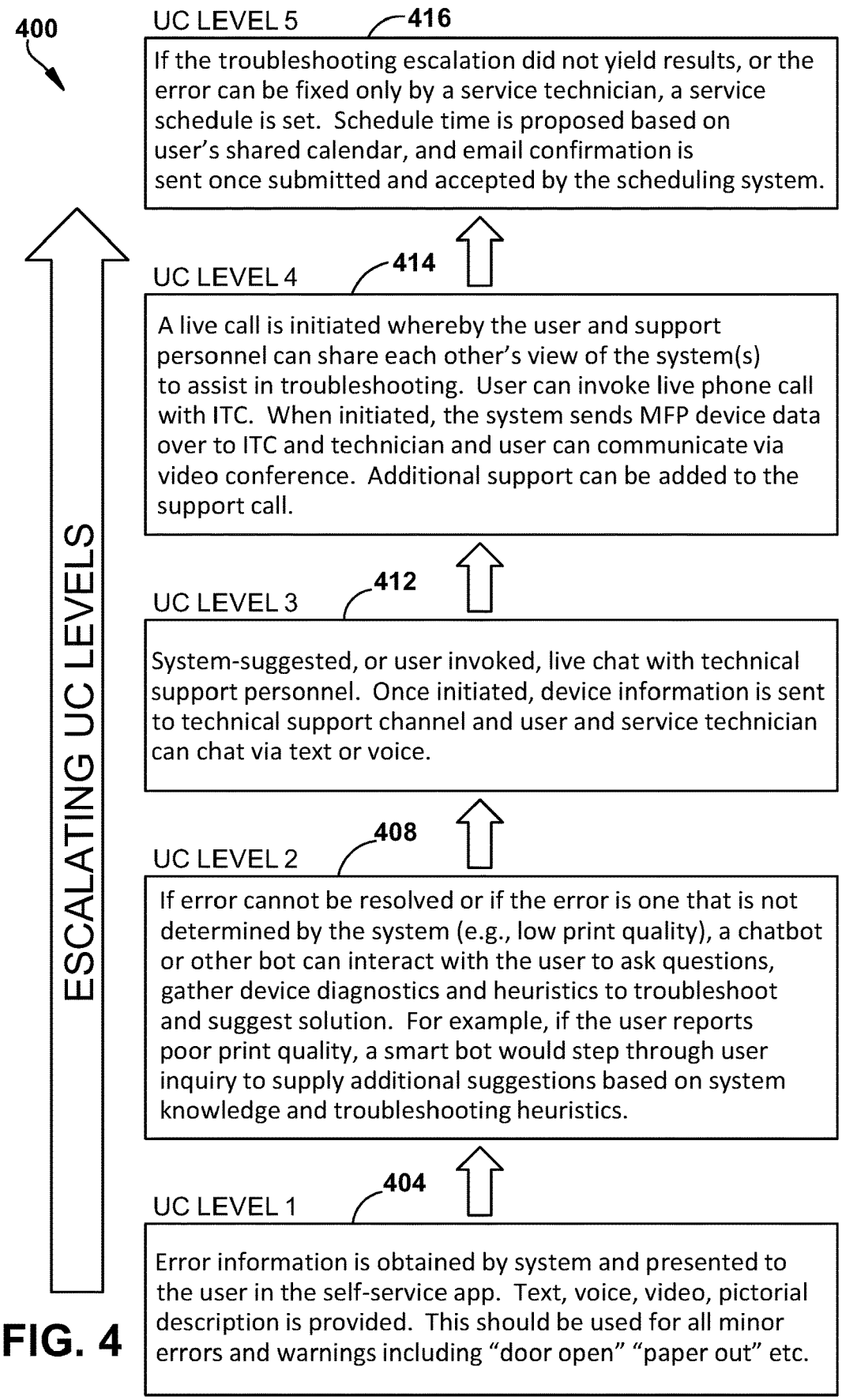
FIG. 4 is an example embodiment of escalating communication levels or sequences.

Turning next to FIG. 4, illustrated is an example embodiment of escalating UC levels 400 such as may be provided in connection with user interaction with detected MFP device state conditions, such as an error condition. The example includes five UC levels, although it is to be appreciated that any desired number of levels, and level content, may suitably be used. In the example, the base or lowest UC level 1, 404 sets that error information is obtained by the system and presented to the user in the self-service app. Text, voice, video, or pictorial description is provided. This is suitably used for minor errors and warnings including "door open", "paper out," etc.

Next, UC level 2, 408 is used when error cannot be resolved or if the error is one that is not determined by the system (e.g., low print quality). A chatbot or other suitable bot interacts with the user to ask questions, gather device diagnostics and heuristics to troubleshoot and suggest a solution. For example, if the user reports poor print quality, a smart bot would step through a user inquiry to supply additional suggestions based on system knowledge and troubleshooting heuristics.

Escalation is then made to UC level 3, 412 wherein a system suggested, or user invoked, live chat with technical support personnel is initiated. Once initiated, device information is suitably sent to a technical support channel and the user and service technician can chat via text or voice.

A next level of escalation, UC level 4, 414 comprises initiating a live call, suitably using tools such as Apple's Facetime or Microsoft's Skype, is initiated whereby the user and support personnel can share each other's view of the system to assist in troubleshooting. A user can invoke live instrumental telecommunication (ITC) session. When initiated, the system suitably sends MFP device data over to an ITC session and a technician and user can communicate via video conference. Additional support can be added to the support call.

A highest escalation level of the example embodiment of FIG. 4, UC level 5, 416 is used if earlier troubleshooting escalation did not yield results, or the error can be fixed only by a service technician. In such a situation, a service schedule is suitably set. Schedule time is suitably based on user's shared calendar, and email confirmation is sent once submitted and accepted by the scheduling system.

Figure 5:
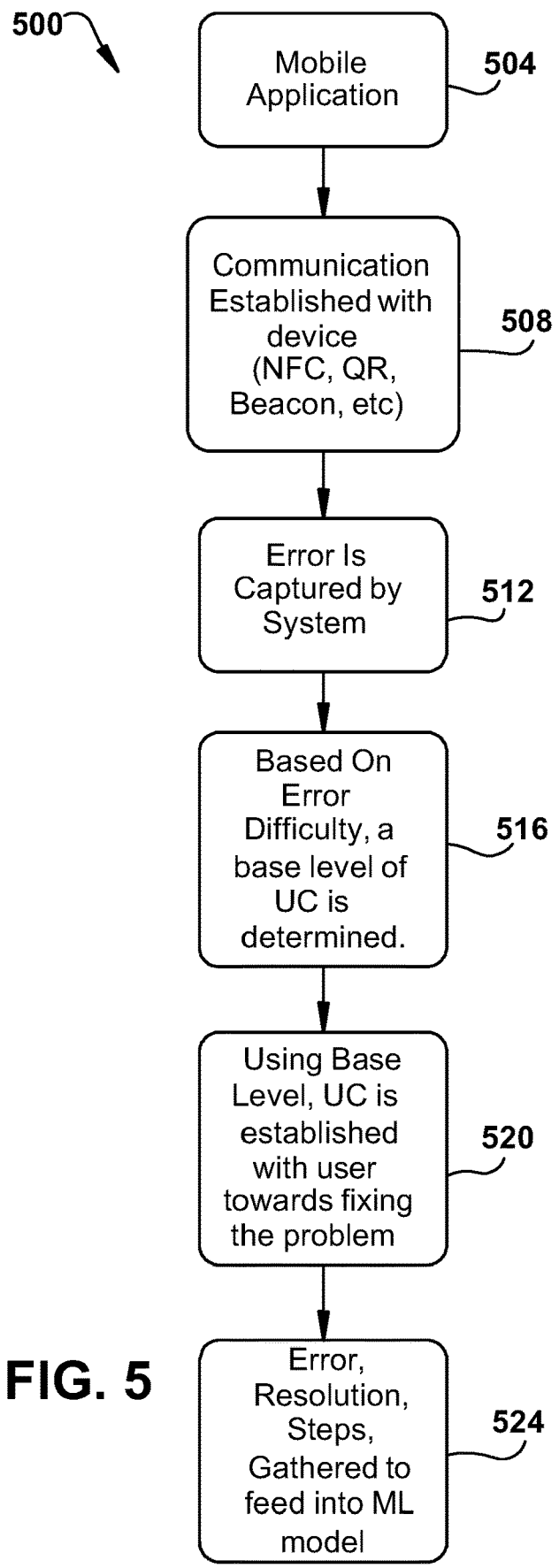
FIG. 5 is an example embodiment of self-service device diagnostics and resolution using a mobile application.

FIG. 5 is a flowchart 500 of an example embodiment of a system for self-service device diagnostics and resolution using a mobile application. A mobile application is launched at block 504 and communication between a device, such an MFP, is established at block 508. An error is captured from the device at block 512. Next, at block 516, a base UC level is determined based on an identified error difficulty, and optionally on a sophistication level of an associated user. An UC is established with the user towards fixing the problem at block 520. Error resolution steps are taken and results gathered into a machine learning model at block 524.

Figure 6:
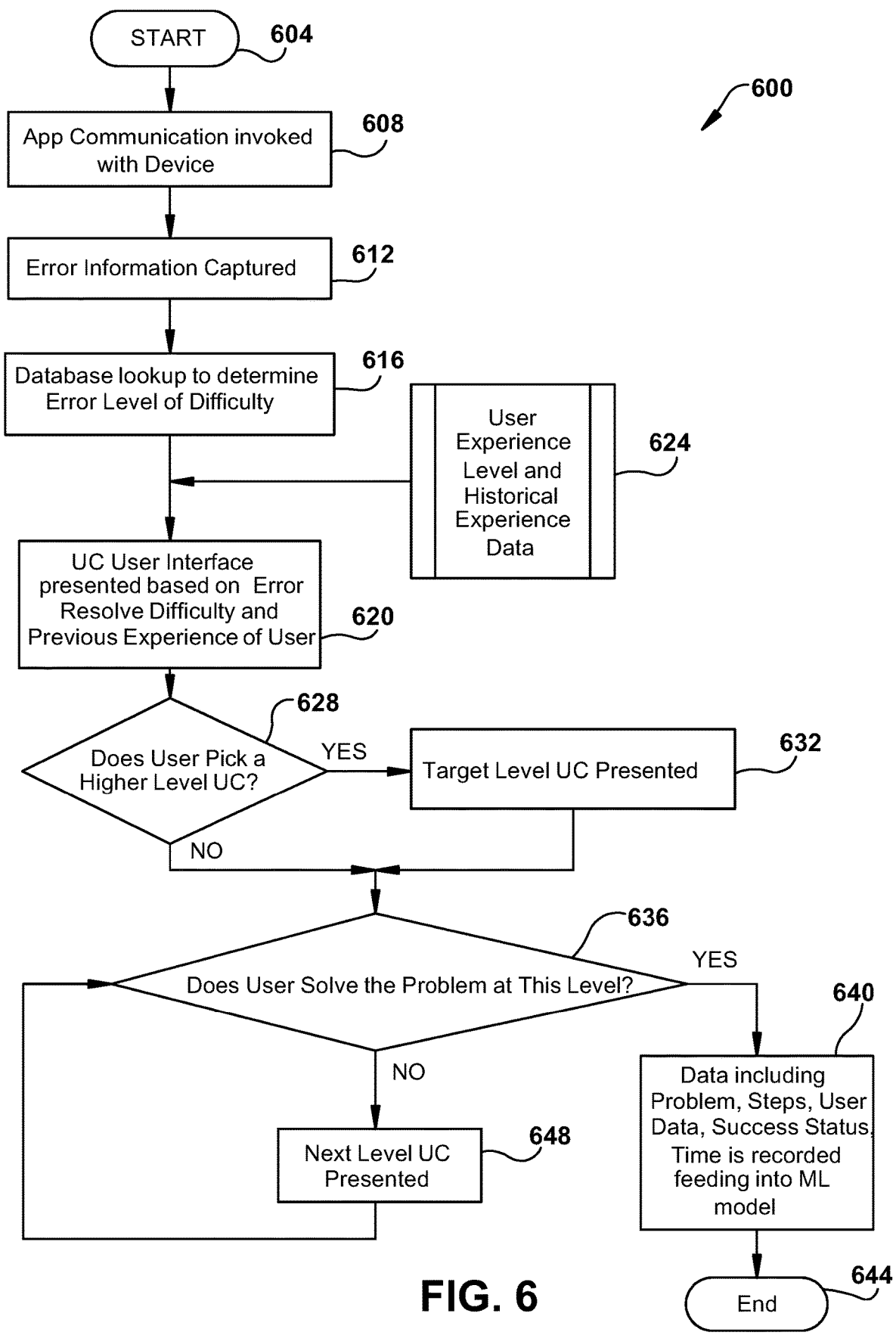
FIG. 6 is an example embodiment of a system for progressive multilevel self-service device diagnostics and resolution.

FIG. 6 is a flowchart 600 of an example embodiment of a system for progressive multilevel self-service device diagnostics and resolution. The process commences at block 604 and proceeds to block 608 where an application or app invokes communication with a device, such as an MFP. Any suitable data connection may be used. With handheld devices, wireless data communication may be advantageous using optical or RF communication, including but not limited to Bluetooth, NFC or Wi-Fi connectivity. Error information from the device is captured at block 612, and a determination of an associated difficulty level is determined at block 616, suitably by a database lookup. The determined difficulty level, suitably accompanied by a user experience or sophistication level from block 624, is used to determine a UC interface to be presented at block 620. The user may override a selected UC level at block 628 with a UC level of their own desire. If a user selects a level, it is implemented at block 632. If not, the previously determined UC level will be used. In either instance, a check is made at block 636 to determine whether the user was able to resolve the problem at that level. If so, resultant data including identified problems, steps taken, success status and implementation time is captured into a machine learning model at block 640 to further refine and improve the system over time. If the problem is determined to still exist at block 636, a next or escalated UC level is presented at block 648, and the process returns to block 636.

Figure 7:
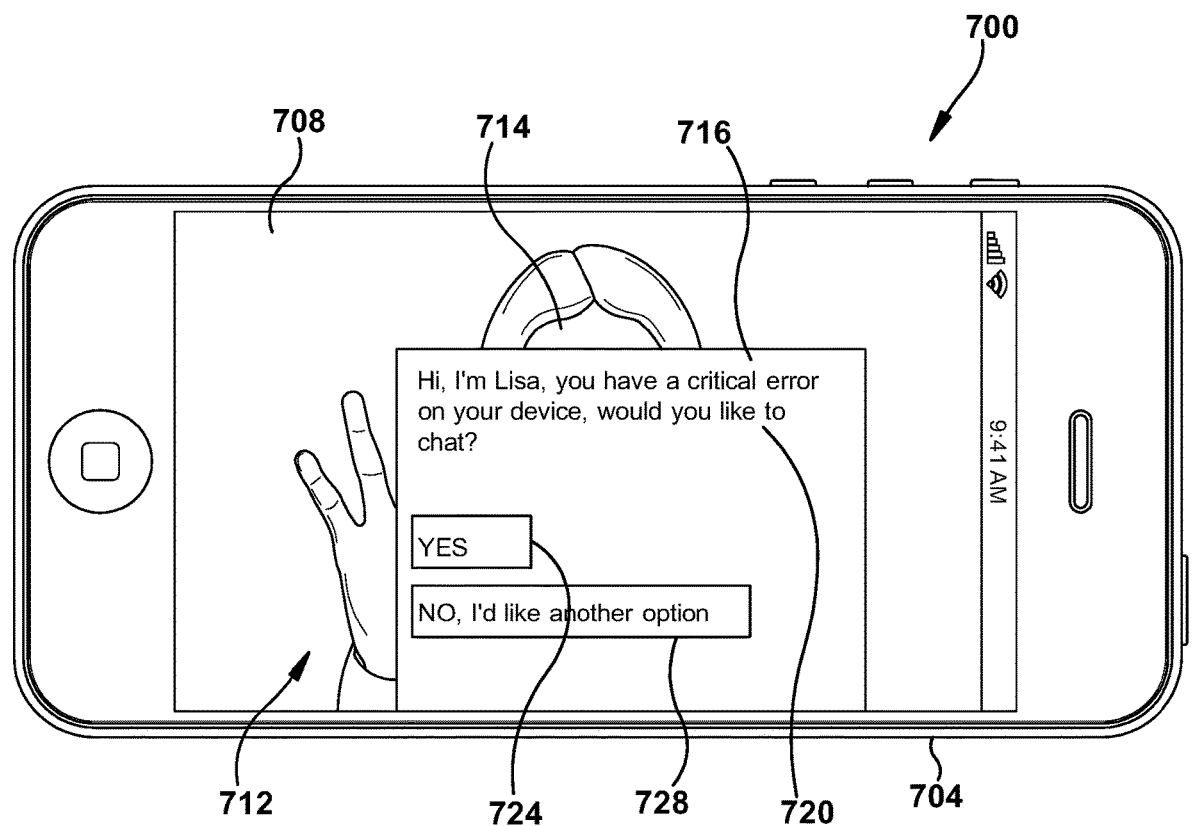
FIG. 7 is an example embodiment of a user interface on a portable user device.

FIG. 7 illustrates an example embodiment of a user interface 700 on a portable user device, such as smartphone 704, for self-service device diagnostics and resolution. A display 708 of smartphone 704 shows a live audio/video connection 712 with a device support technician 714. During a support interaction, a dialog box 716 is opened and a user prompt 720 generated to offer user assistance. Acceptance of assistance is made by selecting button 724 and declined by selecting button 728. If assistance is accepted, a verbal, visual or textual interchange between the user and technician is commenced as a UC session.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
    a processor;
    a user interface;
    a memory storing sequence data corresponding to a plurality of communication sequences, each sequence being stored associatively with a data corresponding to a multifunction peripheral error condition, the memory further storing experience level information for each of a plurality of device users; and
    a wireless data interface configured to transmit state data corresponding to a current multifunction peripheral error condition state,
    wherein the processor is configured to select an automated initial communication sequence with the identified user, which associated with an error condition corresponding to transmitted state data in accordance with an experience level associated with an identified user,
    wherein the processor is configured to initiate a selected initial communication sequence comprised of user instructions communicated to the identified user via the user interface,
    wherein the wireless data interface is further configured to communicate, via the wireless data interface, updated state data corresponding to a state of the multifunction peripheral after completion of the initial communication sequence,
    wherein the processor is further configured to determine if the error condition state has been alleviated in accordance with the updated state data, and
    wherein the processor is further configured select an automated second communication sequence with the identified user when the processor determines that the error condition state has not been alleviated after completion of the initial communication sequence, wherein the second communication sequence is comprised of an interactive dialog via the user interface.

2. The system of claim 1 wherein the processor is further configured to select each communication sequence in accordance with a difficulty level associated with the error condition.

3. The system of claim 2 wherein the processor is further configured to select at least one communication sequence in accordance with a known experience level of the user.

4. The system of claim 3 wherein the initial communication sequence is comprised of text, video or pictorial information supplied via the user interface.

5. The system of claim 4 wherein the second communication sequence is comprised of an interactive dialog with the user.

6. The system of claim 5,
wherein the wireless data interface is further configured to communicate re-updated state data corresponding to a state of the multifunction peripheral after completion of the second communication sequence,
wherein the processor is further configured to determine if the error condition state has been alleviated in accordance the re-updated status data; and
wherein the processor is further configured to select a third communication sequence when the processor determines that the error condition state has not been alleviated by completion of the second communication sequence.

7. The system of claim 6 wherein the third communication sequence is comprised of communication between the user and a technician via the user interface.

8. A method comprising:
storing, in a memory, sequence data corresponding to a plurality of communication sequences, each sequence being stored associatively with a data corresponding to a multifunction peripheral error condition;
transmitting state data corresponding to a current multifunction peripheral error condition state via a wireless interface;
selecting, via a processor, an initial communication sequence associated with an error condition corresponding to transmitted state data;
initiating a selected initial communication sequence with a user via the user interface the initial communication sequence being comprised of text, video or pictorial information supplied via the user interface;
communicating, via the wireless data interface, updated state data corresponding to a state of the multifunction peripheral after completion of the initial communication sequence via the wireless interface;
determining if the error condition state has been alleviated in accordance with the updated state data;
selecting a second communication sequence when the processor determines that the error condition state has not been alleviated after completion of the initial communication sequence, wherein the second communication sequence is comprised of an interactive dialog with the user;
initiating the second communication sequence;
communicating, via the wireless data interface, re-updated state data corresponding to a state of the multifunction peripheral after completion of the second communication sequence;
determining if the error condition state has been alleviated in accordance the re-updated status data; and
selecting, by the processor, a third communication sequence when the processor determines that the error condition state has not been alleviated by completion of the second communication sequence, wherein the third communication sequence is comprised of communication between the user and a technician via the user interface;
wherein each communication sequence is selected in accordance with a difficulty level associated with the error condition, and
wherein at least one communication sequence is selected in accordance with a known experience level of the user.

9. The system of claim 8 wherein the third communication sequence is comprised of communication between the user and a technician via the user interface.

10. A system comprising:
a processor;
a memory storing sequence data corresponding to a plurality of communication sequences, each sequence being stored associatively with a data corresponding to a multifunction peripheral error condition, the memory further storing skill level data corresponding to a technical skill level of each of a plurality of users of a multifunction peripheral; and
a user interface including a user input and a display,
wherein the processor is configured to determine an error condition of the multifunction peripheral;
wherein the processor is further configured to select an initial communication sequence comprised of text, video or pictorial user instructions to address the error condition in accordance with a skill level of an identified user;
wherein the processor is further configured to output a selected initial communication sequence to the user via the user interface;
wherein the processor is further configured to determine whether the error condition still exists after completion of the initial communication sequence; and
wherein the processor is further configured to select a second communication sequence comprised of interactive dialog with the user via the user interface when the error condition is determined to still exist when the second communication sequence is compatible with the skill level of the identified user.

11. The system of claim 10 wherein the processor is further configured to:
determine whether the error condition still exists after completion of the second communication sequence; and
initiate a remote communication session between the user and a technician via the user interface when the error condition is determined to still exist after completion of the second communication sequence.

12. The system of claim 11 wherein the remote communication session is comprised of a text chat session.

13. The system of claim 11 wherein the remote communication session is comprised of a telecommunication session between the user and the technician.

* * * * *